US010393444B2

(12) United States Patent
Kusuda et al.

(10) Patent No.: US 10,393,444 B2
(45) Date of Patent: Aug. 27, 2019

(54) AIRCRAFT HEAT EXCHANGER

(71) Applicant: THE BOEING COMPANY, Chicago, IL (US)

(72) Inventors: Charles E. Kusuda, Mukilteo, WA (US); Christopher Stephen Roper, Santa Monica, CA (US); William Vannice, Kent, WA (US); Arun Muley, San Pedro, CA (US); Kevin John Maloney, Cambridge (GB)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/966,189

(22) Filed: Apr. 30, 2018

(65) Prior Publication Data

US 2018/0356158 A1 Dec. 13, 2018

Related U.S. Application Data

(63) Continuation of application No. 13/785,973, filed on Mar. 5, 2013, now abandoned.

(51) Int. Cl.
*B60H 1/00* (2006.01)
*F01N 5/02* (2006.01)
(Continued)

(52) U.S. Cl.
CPC ......... *F28D 1/0477* (2013.01); *F28D 1/0226* (2013.01); *F28D 1/06* (2013.01);
(Continued)

(58) Field of Classification Search
CPC ........ F28D 1/06; F28D 1/0226; F28D 1/0477; F28D 7/0058; F28F 2210/02
(Continued)

(56) References Cited

U.S. PATENT DOCUMENTS 2,168,166 A * 8/1939 Larrecq .................. B64D 33/10
123/41.21
3,415,316 A 12/1968 Burne
(Continued)

FOREIGN PATENT DOCUMENTS

GB 741988 A 12/1955
GB 1146657 A 3/1969
(Continued)

OTHER PUBLICATIONS

Kevin Maloney, "Multifunctional heat exchangers derived from three-dimensional micro-lattice structures" (Year: 2012).*
(Continued)

*Primary Examiner* — Paul Alvare
(74) *Attorney, Agent, or Firm* — McDonnell Boehnen Hulbert & Berghoff LLP

(57) ABSTRACT

An aircraft including an airframe, a propulsion system, and a heat exchanger is presented. The heat exchanger of the aircraft may include (i) a structural body including a plurality of hollow channels, (ii) a first fluid positioned within the plurality of hollow channels of the structural body, (iii) a plurality of openings positioned on a first side of the structural body and in fluid communication with the plurality of hollow channels, (iv) a wick structure positioned on the first side of the structural body, and further positioned adjacent to an exterior of the plurality of hollow channels and in fluid communication with the plurality of openings, (v) an inlet to the structural body operable to provide a second fluid from an aircraft system, and (vi) an outlet from the structural body operable to receive the second fluid after receiving heat from the first fluid.

9 Claims, 11 Drawing Sheets

(51) Int. Cl.

| | |
|---|---|
| ***F28D 7/02*** | (2006.01) |
| ***F28D 1/047*** | (2006.01) |
| ***F28D 1/06*** | (2006.01) |
| ***F28D 7/00*** | (2006.01) |
| ***F28D 1/02*** | (2006.01) |
| ***F28D 15/02*** | (2006.01) |
| ***F28D 15/04*** | (2006.01) |
| *F28D 21/00* | (2006.01) |

(52) U.S. Cl.
CPC ....... *F28D 7/0058* (2013.01); *F28D 15/0275* (2013.01); *F28D 15/04* (2013.01); *F28D 2001/028* (2013.01); *F28D 2021/0021* (2013.01); *F28F 2210/02* (2013.01); *F28F 2260/02* (2013.01)

(58) Field of Classification Search
USPC ............................................ 165/51, 41, 164
See application file for complete search history.

(56) References Cited

U.S. PATENT DOCUMENTS

| | | | | |
|---|---|---|---|---|
| 3,435,893 | A | 4/1969 | Withers | |
| 4,027,476 | A * | 6/1977 | Schmidt | B01J 35/02 181/258 |
| 4,125,153 | A | 11/1978 | Stoneberg | |
| 4,369,605 | A | 1/1983 | Opersteny | |
| 4,540,045 | A | 9/1985 | Molitor | |
| 4,632,181 | A | 12/1986 | Graham | |
| 4,683,121 | A | 7/1987 | Goudriaan | |
| 2,710,443 | A | 6/1995 | Webb | |
| 5,667,168 | A | 9/1997 | Fluegel | |
| 6,623,687 | B1 | 9/2003 | Gervasi | |
| 7,190,580 | B2 | 3/2007 | Bezama | |
| 7,382,959 | B1 | 6/2008 | Jacobsen | |
| 7,653,276 | B1 | 1/2010 | Gross | |
| 7,992,625 | B1 | 8/2011 | Spokoiny | |
| 2003/0010483 | A1 | 1/2003 | Ikezaki | |
| 2006/0101849 | A1 | 5/2006 | Taras | |
| 2008/0196875 | A1 | 8/2008 | Kurtz | |
| 2010/0101978 | A1 | 4/2010 | Gordon | |
| 2010/0236759 | A1 * | 9/2010 | Wadley | E04C 2/34 165/104.19 |
| 2010/0300669 | A1 | 12/2010 | Jacobsen | |
| 2011/0132817 | A1 | 6/2011 | Gardner | |

FOREIGN PATENT DOCUMENTS

| | | | |
|---|---|---|---|
| GB | 2048108 | A | 12/1980 |
| WO | 2004063639 | A2 | 7/2004 |
| WO | 2010061235 | A1 | 6/2010 |
| WO | 2011051106 | A1 | 5/2011 |

OTHER PUBLICATIONS

Hay et al., "Discharge Coefficients of Cooling Holes with Radiused and Chamfered Inlets", 1991*.

Published Document entitled "Multifunctional heat exchangers derived from three-dimensional micro-lattice structures", publicly available Jan. 28, 2012*.

Extended European Search Report EP14157663.7 and Written Opinion dated May 20, 2014*.

Office Action issued in Canadian Patent Application No. 2,836,709 dated Dec. 21, 2015*.

Communication issued in European Patent Application No. 14157663.7 dated Oct. 9, 2015*.

Maloney et al., "Multifunctional heat exchangers derived from three-dimensional micro-lattice structures", International Journal of Heat and Mass Transfer, vol. 55, Issues 9-10, pp. 2486-2493 (2012)*.

Office action for application No. 2,836,709 from Canadian Intellectual Property Office dated Feb. 10, 2015*.

Brignoni, "Effects of nozzle-inlet chamfering on pressure drop and heat trasnfer in confined air jet impingement"*.

Paczuski, "Experimental Investigation of Pressure Drop in Valve Ports and Conduits of Hermetic Compressors"*.

* cited by examiner

AIRCRAFT HEAT EXCHANGER

This application is a continuation of U.S. patent application Ser. No. 13/785,973, filed Mar. 5, 2013, the contents of which is hereby incorporated by reference.

FIELD

Embodiments of the present disclosure relate generally to an aircraft including an airframe, a propulsion system, and a heat exchanger. More particularly, embodiments of the present disclosure relate to aircraft heat exchangers.

BACKGROUND

Aircrafts may include heat exchangers for use in various thermal management applications such as heating, refrigeration, and air conditioning. Such heat exchangers may transfer heat from one medium to another. The media may be separated to never mix or may be in direct contact. Interface pressure loss may represent a significant component consideration. Generally the rate of heat transfer is proportional to the heat exchanger size. Ongoing research is in part focused on development of efficient heat exchanger systems that are light and small in size.

SUMMARY

In a first aspect, an aircraft is provided. The aircraft includes an airframe, a propulsion system, and a heat exchanger. The heat exchanger comprises (i) a structural body operable to support aviation induced structural loads, wherein the structural body includes a plurality of hollow channels forming two interpenetrating fluidically isolated volumes, and wherein each of the plurality of hollow channels comprise a hollow three-dimensional micro-truss comprising a plurality of hollow truss elements extending along at least three directions, and a plurality of hollow nodes interpenetrated by the hollow truss elements, (ii) a first fluid positioned within the plurality of hollow channels of the structural body, wherein the first fluid comprises a heat pipe fluid, (iii) a plurality of openings in fluid communication with the plurality of hollow channels, wherein the plurality of openings are positioned on a first side of the structural body, (iv) a wick structure positioned on the first side of the structural body, wherein the wick structure is positioned adjacent to an exterior of the plurality of hollow channels and in fluid communication with the plurality of openings, (v) an inlet to the structural body operable to provide a second fluid from an aircraft system, wherein the second fluid comprises a cooling fluid, wherein the second fluid is configured to flow external to the plurality of hollow channels and isolated from the first fluid such that the structural body is operable to exchange heat between the first fluid and the second fluid, and (vi) an outlet from the structural body operable to receive the second fluid after receiving heat from the first fluid.

In a second aspect, a micro-lattice cross-flow heat exchanger for an aircraft is provided. The micro-lattice cross-flow heat exchanger comprises (i) a structural body operable to support aviation induced structural loads, wherein the structural body includes a plurality of hollow channels forming two interpenetrating fluidically isolated volumes, and wherein each of the plurality of hollow channels comprise a hollow three-dimensional micro-truss comprising a plurality of hollow truss elements extending along at least three directions, and a plurality of hollow nodes interpenetrated by the hollow truss elements, (ii) a first fluid positioned within the plurality of hollow channels of the structural body, wherein the first fluid comprises a heat pipe fluid, (iii) a plurality of openings in fluid communication with the plurality of hollow channels, wherein the plurality of openings are positioned on a first side of the structural body, (iv) a wick structure positioned on the first side of the structural body, wherein the wick structure is positioned adjacent to an exterior of the plurality of hollow channels and in fluid communication with the plurality of openings, (v) an inlet to the structural body operable to provide a second fluid from an aircraft system, wherein the second fluid comprises a cooling fluid, wherein the second fluid is configured to flow external to the plurality of hollow channels and isolated from the first fluid such that the structural body is operable to exchange heat between the first fluid and the second fluid, and (vi) an outlet from the structural body operable to receive the second fluid after receiving heat from the first fluid.

In a third aspect, a method for operating a micro-lattice cross-flow heat exchanger for an aircraft is provided. The method includes (i) supporting an aviation induced structural load on a structural body, wherein the structural body includes a plurality of hollow channels forming two interpenetrating fluidically isolated volumes, and wherein each of the plurality of hollow channels comprise a hollow three-dimensional micro-truss comprising a plurality of hollow truss elements extending along at least three directions, and a plurality of hollow nodes interpenetrated by the hollow truss elements, (ii) positioning a first fluid within the plurality of hollow channels of the structural body, wherein the first fluid comprises a heat pipe fluid, (iii) heating a heat pipe surface coupled to the structural body, wherein the heat pipe surface is positioned adjacent to a wick structure positioned on a first side of the structural body, wherein the wick structure is in fluid communication with a plurality of openings which in turn are in fluid communication with the plurality of hollow channels, (iv) flowing a second fluid from an aircraft system, into an inlet of the structural body, external to the plurality of hollow channels and isolated from the first fluid, and out of an outlet of the structural body, wherein the second fluid comprises a cooling fluid, and (v) transferring heat between the first fluid and the second fluid via the structural body.

In a fourth aspect, a method of making a micro-lattice cross-flow heat exchanger for an aircraft is provided, wherein the micro-lattice cross-flow heat exchanger includes a structural body operable to support aviation induced structural loads, wherein the structural body includes a plurality of hollow channels forming two interpenetrating fluidically isolated volumes, wherein each of the plurality of hollow channels comprise a hollow three-dimensional micro-truss comprising a plurality of hollow truss elements extending along at least three directions, and a plurality of hollow nodes interpenetrated by the hollow truss elements, wherein a first side of the structural body includes a plurality of openings in fluid communication with the plurality of hollow channels, and wherein the structural body includes an inlet and an outlet. The method includes (i) positioning a first fluid within the plurality of hollow channels of the structural body, wherein the first fluid comprises a heat pipe fluid, (ii) positioning a wick structure on the first side of the structural body, wherein the wick structure is positioned adjacent to an exterior of the plurality of hollow channels and in fluid communication with the plurality of openings, and (iv) connecting the inlet of the structural body to an aircraft system such that a second fluid of the aircraft system is in fluid communication with the inlet, wherein the second fluid comprises a cooling fluid, wherein the second fluid is configured to flow external to the plurality of hollow channels and isolated from the first fluid such that the structural body is operable to exchange heat between the first fluid and the second fluid, and wherein the outlet of the structural body is operable to receive the second fluid after receiving heat from the first fluid.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
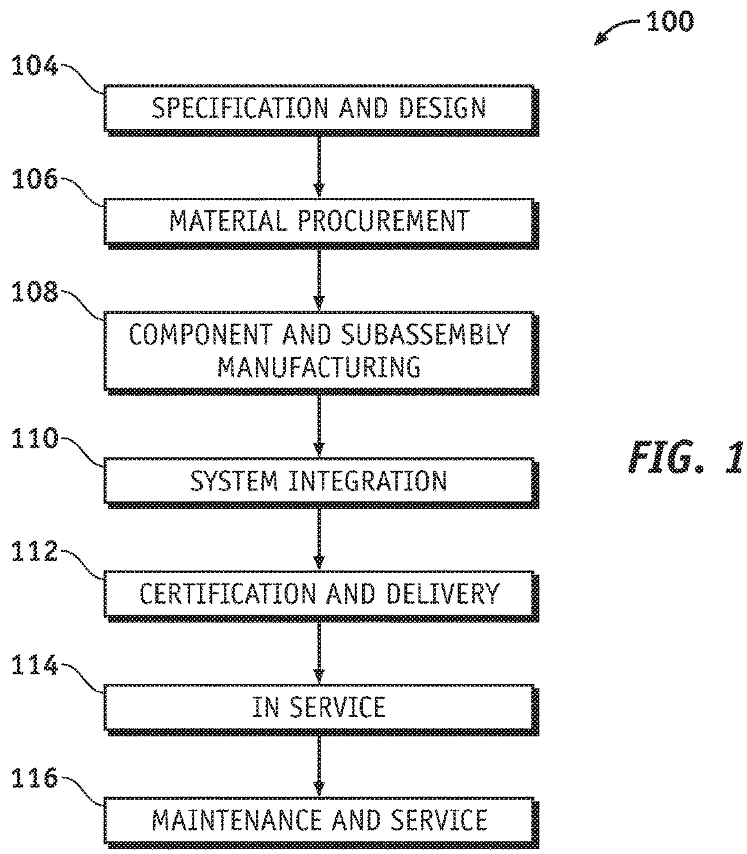
FIG. 1 is an illustration of a flow diagram of an exemplary aircraft production and service methodology.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft, aircraft components, heat exchangers, fluid dynamics, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of some non-limiting applications, namely, an air conditioning heat exchanger. Embodiments of the disclosure, however, are not limited to such air conditioning applications, and the techniques described herein may also be utilized in other applications. For example, embodiments may be applicable to electronics cooling, battery cooling, liquid-liquid heat exchange, gas-liquid heat exchange, slurry-liquid heat exchange (e.g., slush hydrogen to liquid nitrogen), slurry-gas heat exchange, fuel-coolant heat exchange, Synergistic Air-Breathing Rocket Engines (SABRE), engine precoolers, engine oil coolers, hypersonic precoolers, intercoolers, hydraulic fluid heat exchangers, refrigeration heat exchangers, or other heat exchange applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments provide a lightweight, high-performance cross-flow micro-lattice heat exchanger structure for an aircraft, including air to air, liquid to liquid, and liquid to air heat transfer in both single and two-phase flow. Embodiments use a hollow micro-lattice structure as a core structure in the micro-lattice heat exchanger structure for particular applications. A fluid stream is passed through hollow tubes comprising the hollow micro-lattice structure. Another fluid stream passes around the hollow micro-lattice structure.

This fluid passage mechanism permits transfer of heat between the two fluid streams without mixing the two fluids. The hollow micro-lattice structure is well-suited for use in multiple places on an aircraft where high heat transfer between two fluid streams, low fluid pressure drop, low mass and low volume is desirable. For example, the micro-lattice heat-exchanger structure may be used to transfer heat from compressed air stream to a RAM air stream, thus providing a source of cabin air at the proper temperature and pressure for passenger comfort.

Figure 2:
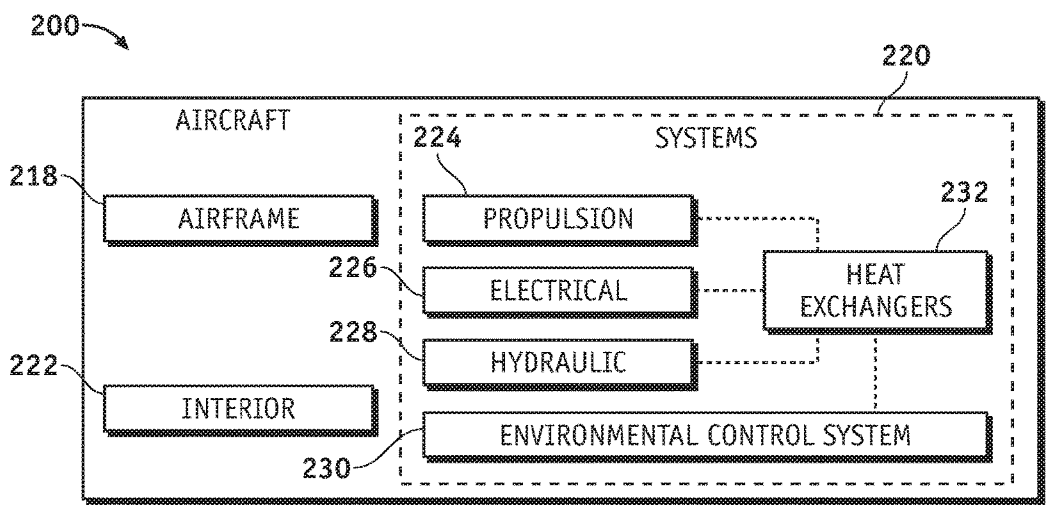
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental control system 230, and one or more heat exchanger systems 232. The one or more heat exchanger systems 232 may be contained in the airframe 218, the interior 222, the systems 220 such as the propulsion system 224, the electrical system 226, the hydraulic system 228, and the environmental control system 230 or any system of the aircraft 200. Any number of other systems may also be included. Although an aerospace example is shown, the embodiments of the disclosure may be applied to other industries.

It should not be inferred from FIG. 2 that an airplane comprises a single, thermal management or, heat exchanger system that manages waste heat from multiple systems. Rather, each system generally comprises one or more heat exchangers to manage waste heat produced by its components.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
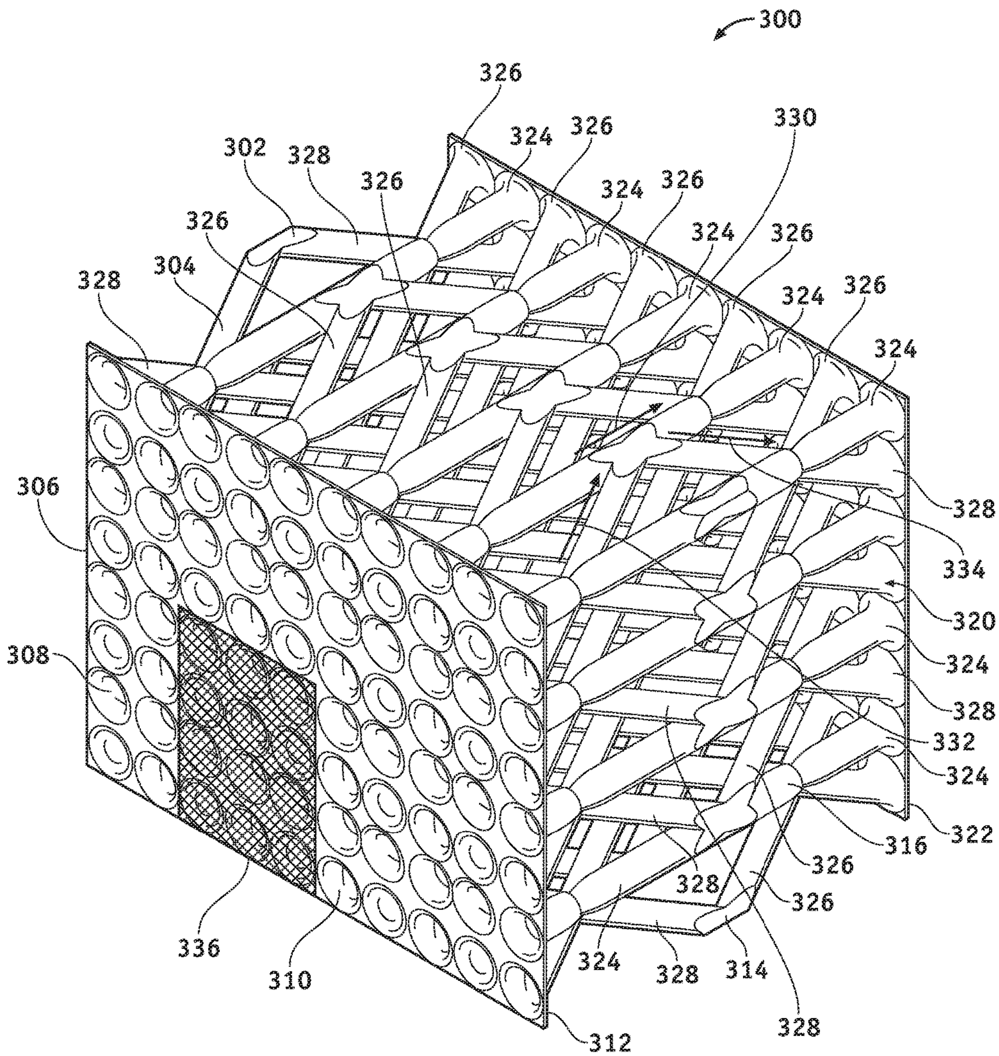
FIG. 3 is an illustration of an exemplary micro-lattice cross-flow heat exchanger according to an embodiment of the disclosure.

FIG. 3 is an illustration of an exemplary micro-lattice cross-flow heat exchanger 300 according to an embodiment of the disclosure. The micro-lattice cross-flow heat exchanger 300 may comprise a structural body 320, a manifold 306/322, and a plurality of hollow nodes 302/314.

The structural body 320 comprises a plurality of hollow channels 304/316 configured to flow a first fluid 522 (FIG. 5) within the hollow channels 304/316 and a second fluid 502 (FIG. 5) external to the hollow channels 304/316.

In one embodiment, the hollow channels 304/316 may be a polymer micro-truss structure in a form of a regular hollow three-dimensional micro-truss of intersecting tubes, configured with hollow nodes 302/314 at the intersections of the hollow channels 304/316, so that an interior of each of the hollow channels 304/316 is in communication with any other hollow channels 304/316 it intersects. The hollow channels 304/316 comprise hollow truss elements within a hollow three-dimensional micro-truss comprising: first hollow truss elements 324 extending along a first direction 330, second truss hollow truss elements 326 extending along a second direction 332, third truss hollow truss elements 328 extending along a third direction 334.

Figure 8:
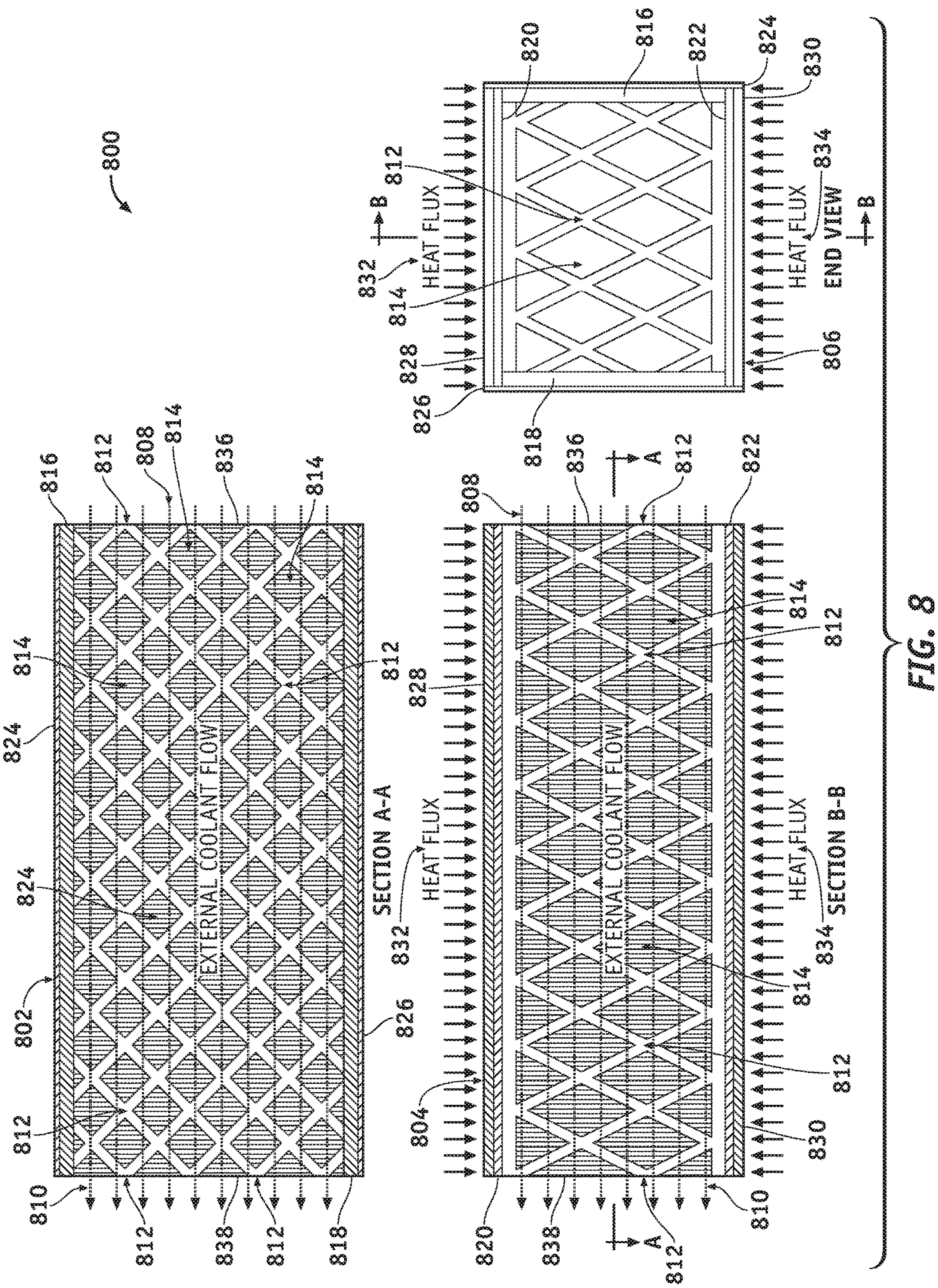
FIG. 8 is an illustration of an exemplary schematic of a micro-lattice cross-flow heat exchanger comprising a heat pipe according to an embodiment of the disclosure.

The hollow channels 304/316 may comprise, for example but without limitation, a cross-sectional shape that can be elliptical, circular, square, triangular, octagonal, star-shaped, a combination thereof, or other shape. Large aspect ratio elliptical shapes may improve heat transfer, and orientation of an ellipse's major axis may enhance heat transfer and enable better control of a pressure drop incurred by flow of the second fluid. In some embodiments, the hollow channels 304/316 may comprise, for example but without limitation, one or more heat pipes 800 (FIG. 8).

Access to an interior fluid volume, formed by connected interiors of the hollow channels 304/316, may be provided by an architected fluid interface, which may also be referred to as a manifold such as the manifold 306/322, at each end of the structural body 320.

The manifold 306/322 is coupled to a first surface 512 and a second surface 518 (FIG. 5) of the structural body 320 respectively. The manifold 306/322 each comprises a plurality of openings 308/310 into the hollow channels 304/316. A cross section (e.g., lateral, longitudinal, or other cross section) of each of the openings 308/310 may comprise, for example but without limitation, a tapered shape (e.g., for a longitudinal cross section), a polygon shape, quadrilateral shape, a cross-section of a hollow pyramid (e.g., for a lateral or longitudinal cross section), or other cross section configuration. The openings 308/310 can be protruding or square-edged, or to reduce pressure drop incurred by the first flow, the openings can be radiused or tapered. The manifold 306/322 may comprise a particulate filter 336. The particulate filter 336 may be used to decrease a head loss coefficient of a flow encountering the openings 308/310.

Each of the hollow channels 304/316 that is at a surface such as the first surface 512 or the second surface 518 where a manifold 306/322 is placed comprises an opening such as the openings 308/310, but some tube segments of the hollow channels 304/316 may connect two nodes instead of one node and one opening or, as illustrated in FIG. 3, into groups of hollow channels 304/316. In the embodiment illustrated in FIG. 3, the openings 308/310 may be in a form of a funnel or hollow pyramid, with a depth approximately or substantially equal to one half of the length, in a direction of a bore of the funnel, of a unit cell of the hollow three-dimensional micro-truss of hollow channels 304/316.

Smooth transitions using the openings 308/310 shaped as described above (e.g., tapered etc.), at an interface between a bulk fluid and a hollow porous material such as the hollow channels 304/316 may result in significantly lower pressure drop for a fluid flowing into the hollow channels 304/316 and higher pressure recovery for a fluid exiting from the hollow channels 304/316 than manifolds having a flat surface with a flush hole for each hollow channels 304/316. In particular, a head loss coefficient of a flow encountering a right-angle inlet is approximately 0.5, while the head loss coefficient for a filleted inlet is as low as 0.04, representing an improvement of 12.5 times.

The hollow nodes 302/314 comprise locations at which the hollow channels 304/316 interpenetrate.

Figure 4:
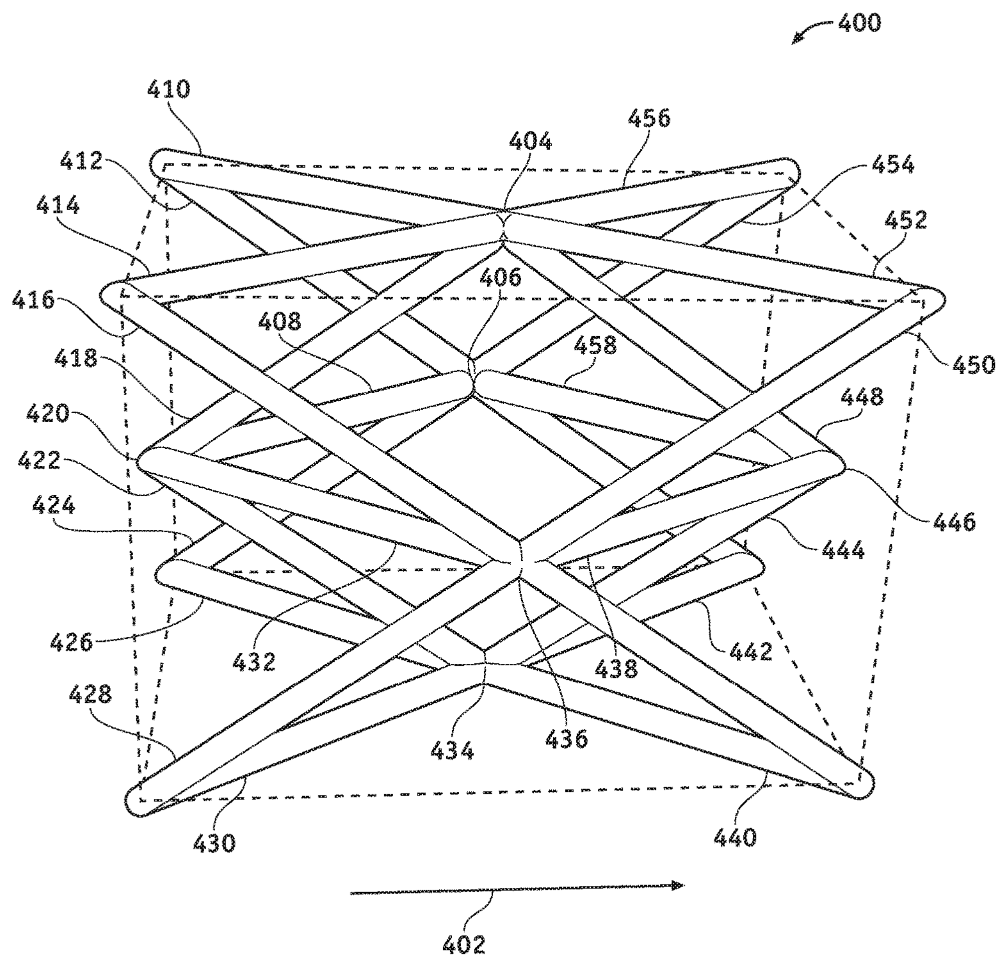
FIG. 4 is an illustration of an expanded view of an exemplary micro-lattice cross-flow heat exchanger showing hollow channels entering and leaving hollow nodes according to an embodiment of the disclosure.

FIG. 4 is an illustration of an expanded view 400 of an exemplary micro-lattice cross-flow heat exchanger 300 showing hollow channels entering and leaving hollow nodes according to an embodiment of the disclosure. For example but without limitation, hollow nodes 404, 406, 420, 434 and 446 comprise various configurations for flow of a fluid in the direction 402. Hollow node 404 is interpenetrated by hollow truss elements 410, 414 and 418 bringing fluid into the hollow node 404, and by hollow truss elements 448, 452 and 456 receiving fluid from the hollow node 404. Hollow node 406 is interpenetrated by hollow truss elements 408, 412 and 424 bringing fluid into the hollow node 406, and by hollow elements 454, 458 and 460 receiving fluid from the hollow node 406. Hollow node 420 is interpenetrated by hollow truss elements (not shown) bringing fluid into the hollow node 420, and by hollow truss elements 408, 418, 422 and 432 receiving fluid from the hollow node 420. Hollow node 434 is interpenetrated by hollow truss elements 422, 426 and 430 bringing fluid into the hollow node 434, and by hollow truss elements 440, 442 and 444 receiving fluid from the hollow node 434. Node 446 is interpenetrated by hollow truss elements 438, 444, 448 and 458 bringing fluid into the hollow node 446, and by hollow elements (not shown) receiving fluid from the hollow node 446.

Figure 5:
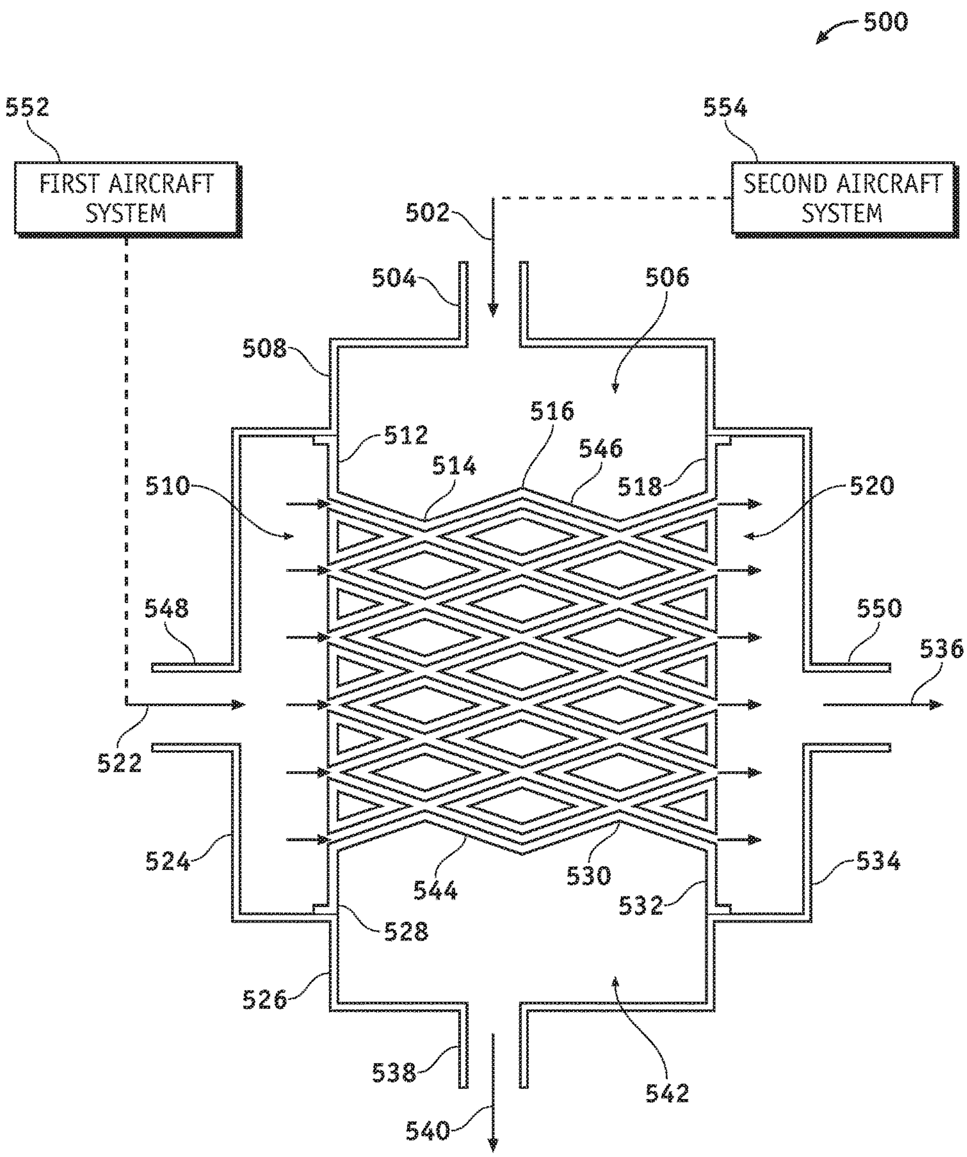
FIG. 5 is an illustration of an exemplary schematic of a micro-lattice cross-flow heat exchanger according to an embodiment of the disclosure.

FIG. 5 is an illustration of an exemplary schematic of a micro-lattice cross-flow heat exchanger 500 according to an embodiment of the disclosure. The micro-lattice cross-flow heat exchanger 500 may comprise a structural body 514 (320 in FIG. 3), a first input manifold 524, a first output manifold 534, a second input manifold 508, and a second output manifold 526.

The first fluid 522 is flowed into the first input manifold 524 coupled to a surface 512 of the structural body 514. The structural body 514 is configured for the first fluid 522 to flow into and within a plurality of hollow channels 546/544 (302/314 in FIG. 3). The structural body 514 comprises a plurality of hollow nodes 516/530 (302/314 in FIG. 3) at which the hollow channels 546/544 interpenetrate. The first input manifold 524 and the first output manifold 534 comprise a plurality of openings 308/310 (see FIG. 3) into the hollow channels 546/544. The first fluid 522 transfers heat to/from the structural body 514 and exits the first output manifold 534 as a first heat changed fluid 536.

The second fluid 502 is flowed into the second input manifold 508 around and external to the hollow channels 546/544. The second fluid 502 transfers heat from/to the structural body 514 and exits the second output manifold 526 as a second heat changed fluid 540. Thereby, heat is transferred between the first fluid 522 and the second fluid 502 via the structural body 514.

In one embodiment, a first aircraft fluid source inlet 548 is configured to provide a first fluid 522 from a first aircraft system 552. A second aircraft fluid source inlet 504 is configured to provide a second fluid 502 from a second aircraft system 554. The structural body 320/514 is configured to support aviation induced structural loads and exchange heat between the first fluid 522 and the second fluid 502. The aviation induced structural loads may comprise, for example but without limitation, a proof and burst load, an air pressure cycling load, a vibration load, an inertial load, a thermal cycling load, an airframe structural support load, a wing fairing bending load, a combination thereof, an/or other aviation structural load.

The structural body 320/514 comprises a plurality of the hollow channels 546/544 forming two interpenetrating fluidically isolated volumes and configured for flow of the first fluid 522 within the hollow channels 546/544 and flow of the second fluid 502 external to the hollow channels 546/544 isolated from the first fluid 522. The hollow channels 546/544 comprise a hollow three-dimensional micro-truss such as the micro-lattice cross-flow heat exchanger 300/500 comprising hollow truss elements extending along at least three directions, and a plurality of hollow nodes interpenetrated by the hollow truss elements as explained above.

The micro-lattice cross-flow heat exchanger 300/500 may be used in, for example but without limitation, an aircraft nitrogen enriched air cooler, a power electronics cooler, a precooler, an air conditioning pack heat exchanger, an oil cooler, a refrigeration condenser, an evaporator exchanging heat between hot and cold refrigerant and air, a hydraulic fluid heat exchanger exchanging heat between hydraulic fluid and fuel or ram air, a liquid cooling system heat exchanger which exchanges heat between liquid coolant and ram air, and other heat exchange application.

The first fluid 522 and the second fluid 502 may comprise, for example but without limitation, an aircraft engine bleed air, an aircraft RAM ambient air, an aircraft nitrogen enriched air cooler, a recycled aircraft cabin air, a fanned heated air from a heat generating component on an aircraft, a pumped aircraft engine oil, a pumped aircraft hydraulic oil, a pumped aircraft gearbox oil, a pumped aircraft liquid coolant, a pumped aircraft refrigerant fluid, a vaporized fluid from a heat pipe, and other fluidic source.

In one embodiment, the micro-lattice cross-flow heat exchanger 500 may use engine bleed air as one fluid (first fluid) and engine fan air as the other fluid (second fluid). This embodiment may be used as a pre-cooler for an aircraft cabin air conditioning and temperature control system.

In another embodiment, the micro-lattice cross-flow heat exchanger 500 may use compressed air (e.g., engine bleed air) as one fluid (first fluid) and ambient (ram) air as the other fluid (second fluid). This embodiment may be used for the aircraft cabin air conditioning and temperature control system.

In a further embodiment, the micro-lattice cross-flow heat exchanger 500 may use compressed air (e.g., engine bleed air) as one fluid (first fluid) and refrigerant as the other fluid (second fluid). This application is a subset of an air conditioning and temperature control system of the aircraft cabin.

Figure 6A:
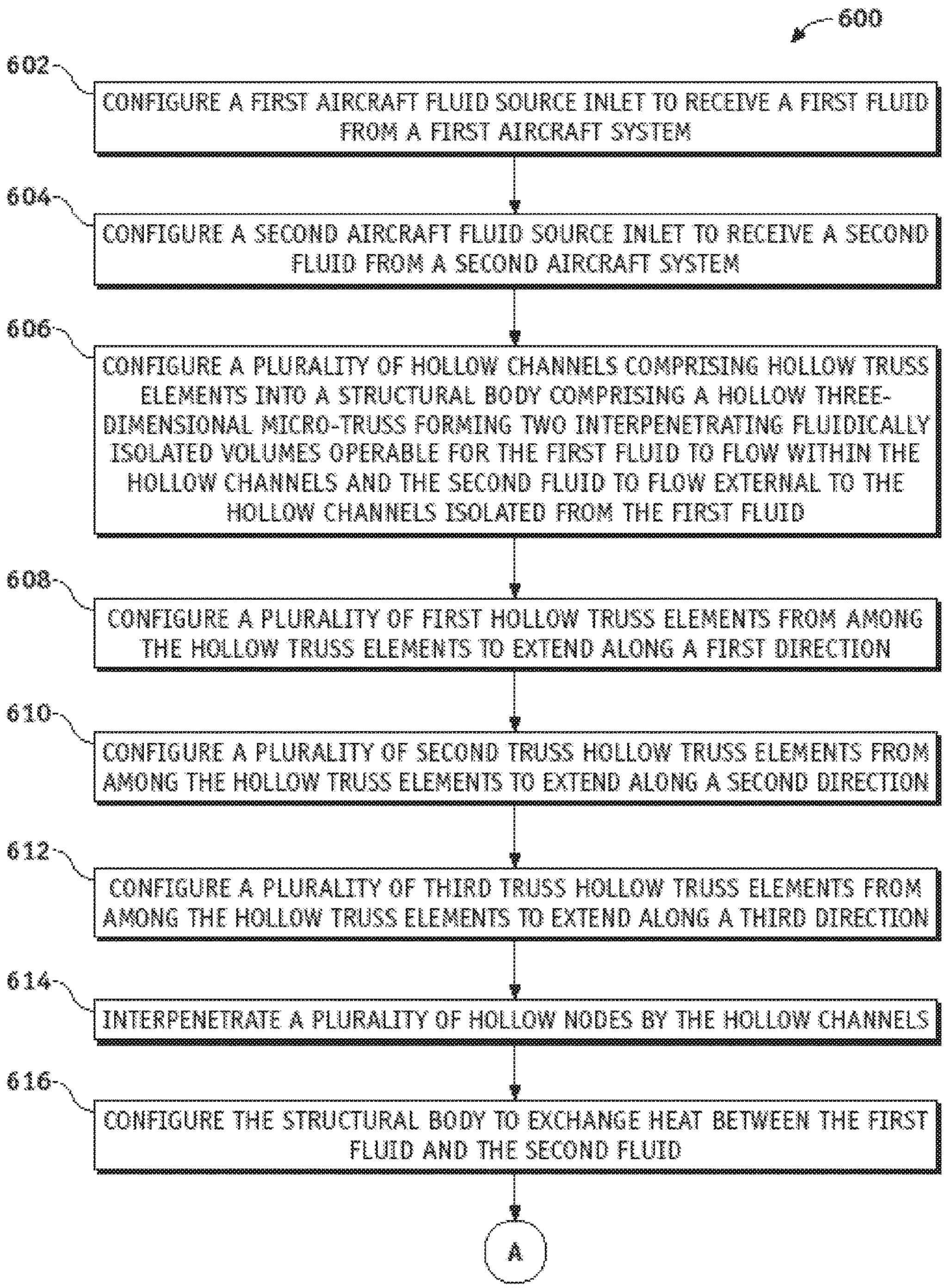
FIG. 6A is an illustration of an exemplary flowchart showing a process for configuring a micro-lattice cross-flow heat exchanger for an aircraft according to an embodiment of the disclosure.
Figure 6B:
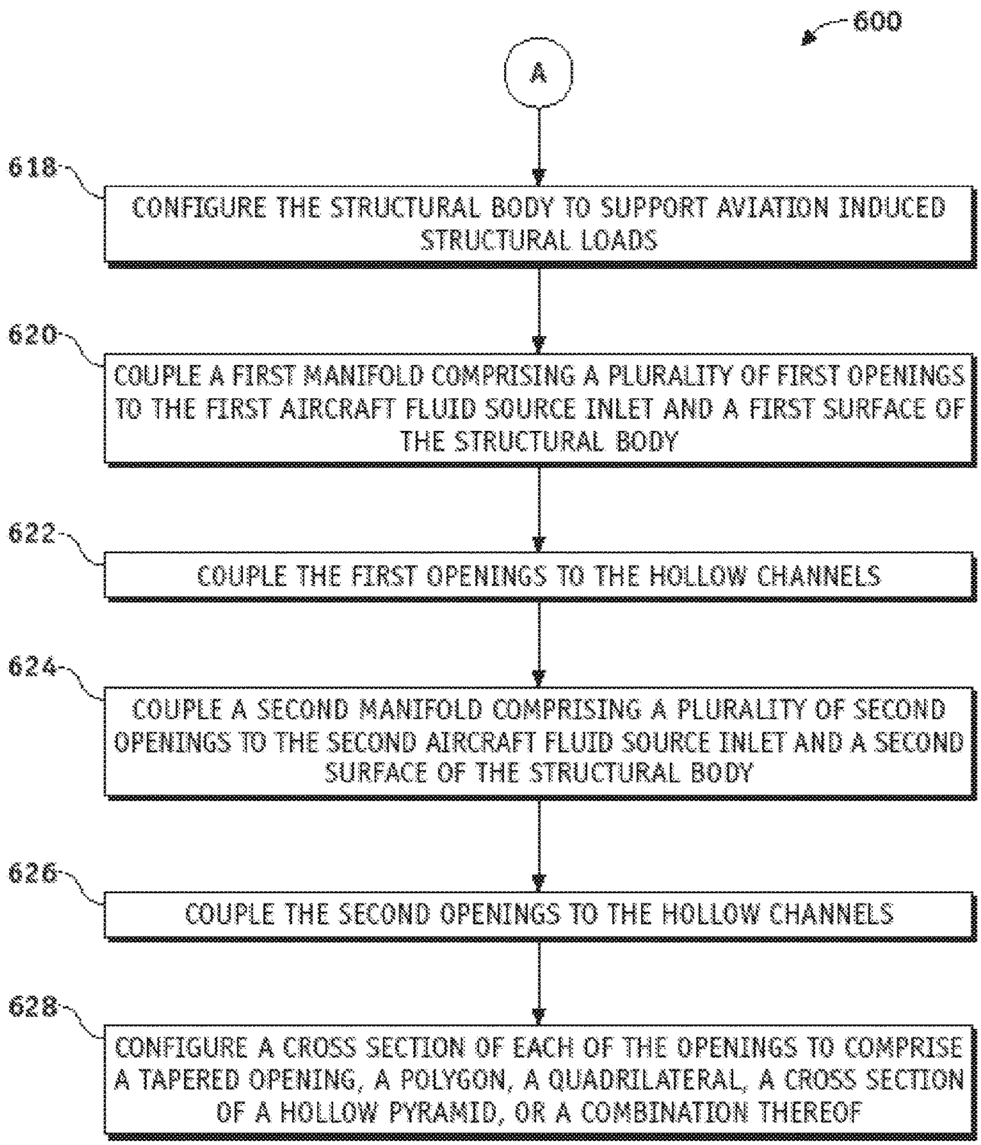
FIG. 6B is an illustration of a continuation of the exemplary flowchart of FIG. 6A showing a process for configuring a micro-lattice cross-flow heat exchanger for an aircraft according to an embodiment of the disclosure.

FIGS. 6A-6B are an illustration of an exemplary flowchart showing a process 600 for configuring a micro-lattice cross-flow heat exchanger for an aircraft according to an embodiment of the disclosure. The various tasks performed in connection with process 600 may be performed mechanically, by software, hardware, firmware, or any combination thereof. For illustrative purposes, the following description of process 600 may refer to elements mentioned above in connection with FIGS. 1-5. In some embodiments, portions of the process 600 may be performed by different elements of the micro-lattice cross-flow heat exchanger 300/500 such as the structural body 320/514, the manifold 306/322, the hollow channels 304/316, the hollow nodes 302/314, the first aircraft system 552, the second aircraft system 554, etc. Process 600 may have functions, material, and structures that are similar to the embodiments shown in FIGS. 1-4. Therefore common features, functions, and elements may not be redundantly described here.

Process 600 may begin by configuring a first aircraft fluid source inlet to receive a first fluid from a first aircraft system (task 602).

Process 600 may continue by configuring a second aircraft fluid source inlet to receive a second fluid from a second aircraft system (task 604).

Process 600 may continue by configuring a plurality of hollow channels comprising hollow truss elements into a structural body comprising a hollow three-dimensional micro-truss forming two interpenetrating fluidically isolated volumes operable for the first fluid to flow within the hollow channels and the second fluid to flow external to the hollow channels isolated from the first fluid (task 606).

Process 600 may continue by configuring a plurality of first hollow truss elements from among the hollow truss elements to extend along a first direction (task 608).

Process 600 may continue by configuring a plurality of second truss hollow truss elements from among the hollow truss elements to extend along a second direction (task 610).

Process 600 may continue by configuring a plurality of third truss hollow truss elements from among the hollow truss elements to extend along a third direction (task 612).

Process 600 may continue by interpenetrating a plurality of hollow nodes by the hollow channels (task 614).

Process 600 may continue by configuring the structural body to exchange heat between the first fluid and the second fluid (task 616).

Process 600 may continue by configuring the structural body to support aviation induced structural loads (task 618).

Process 600 may continue by coupling a first manifold comprising a plurality of first openings to the first aircraft fluid source inlet and a first surface of the structural body (task 620).

Process 600 may continue by coupling the first openings to the hollow channels (task 622).

Process 600 may continue by coupling a second manifold comprising a plurality of second openings to the second aircraft fluid source inlet and a second surface of the structural body (task 624).

Process 600 may continue by coupling the second openings to the hollow channels (task 626).

Process 600 may continue by configuring a cross section (e.g., lateral, longitudinal, or other cross section) of each of the openings to comprise a tapered opening, a polygon, a quadrilateral, a cross section of a hollow pyramid, or a combination thereof (task 628).

A process of forming a hollow porous material such as the hollow channels 304/316 into the structural body 320 is described in U.S. Pat. No. 7,653,276 content of which is incorporated by reference herein in its entirety.

Figure 7A:
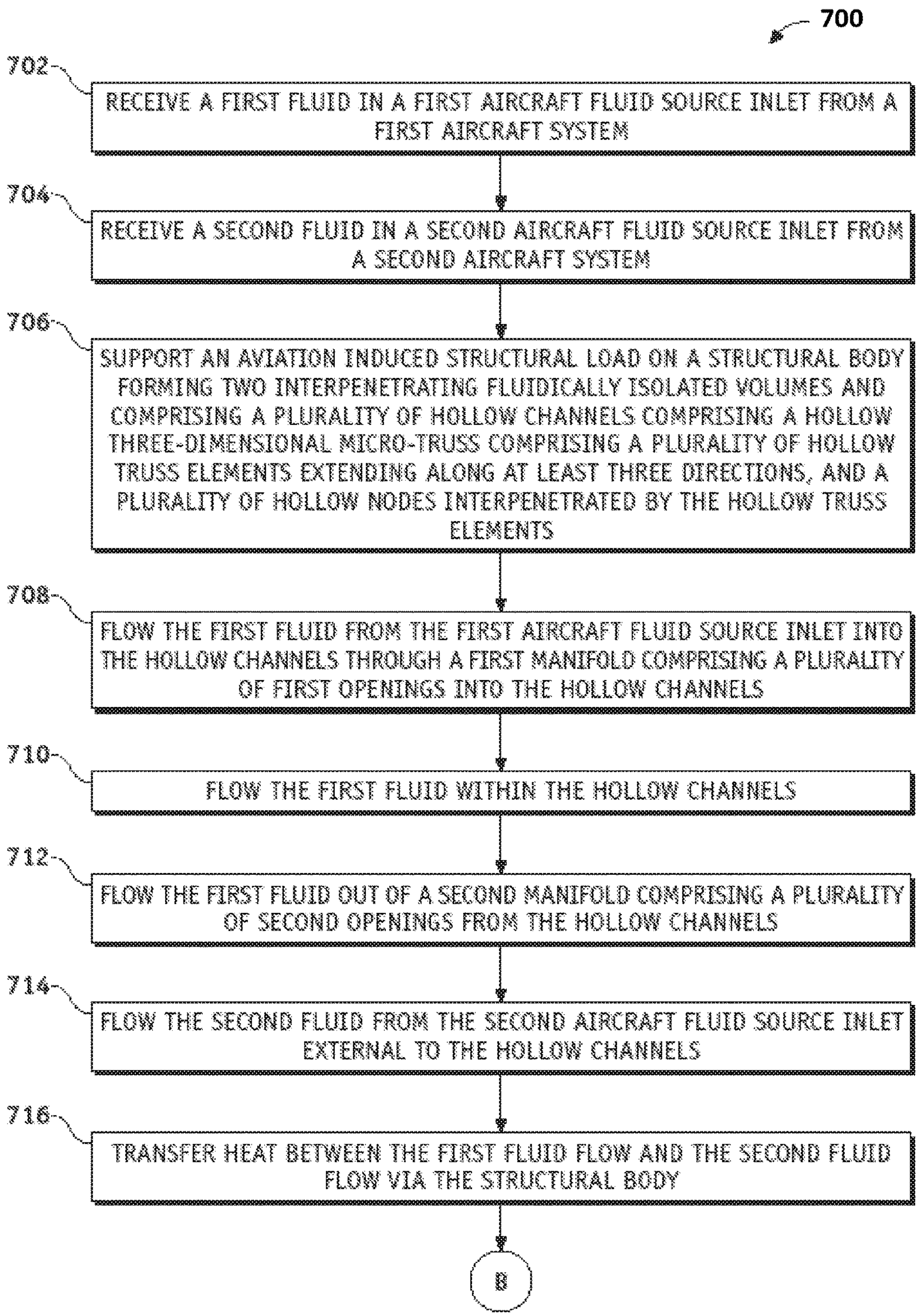
FIG. 7A is an illustration of an exemplary flowchart showing a process for operating a micro-lattice cross-flow heat exchanger for an aircraft according to an embodiment of the disclosure.
Figure 7B:
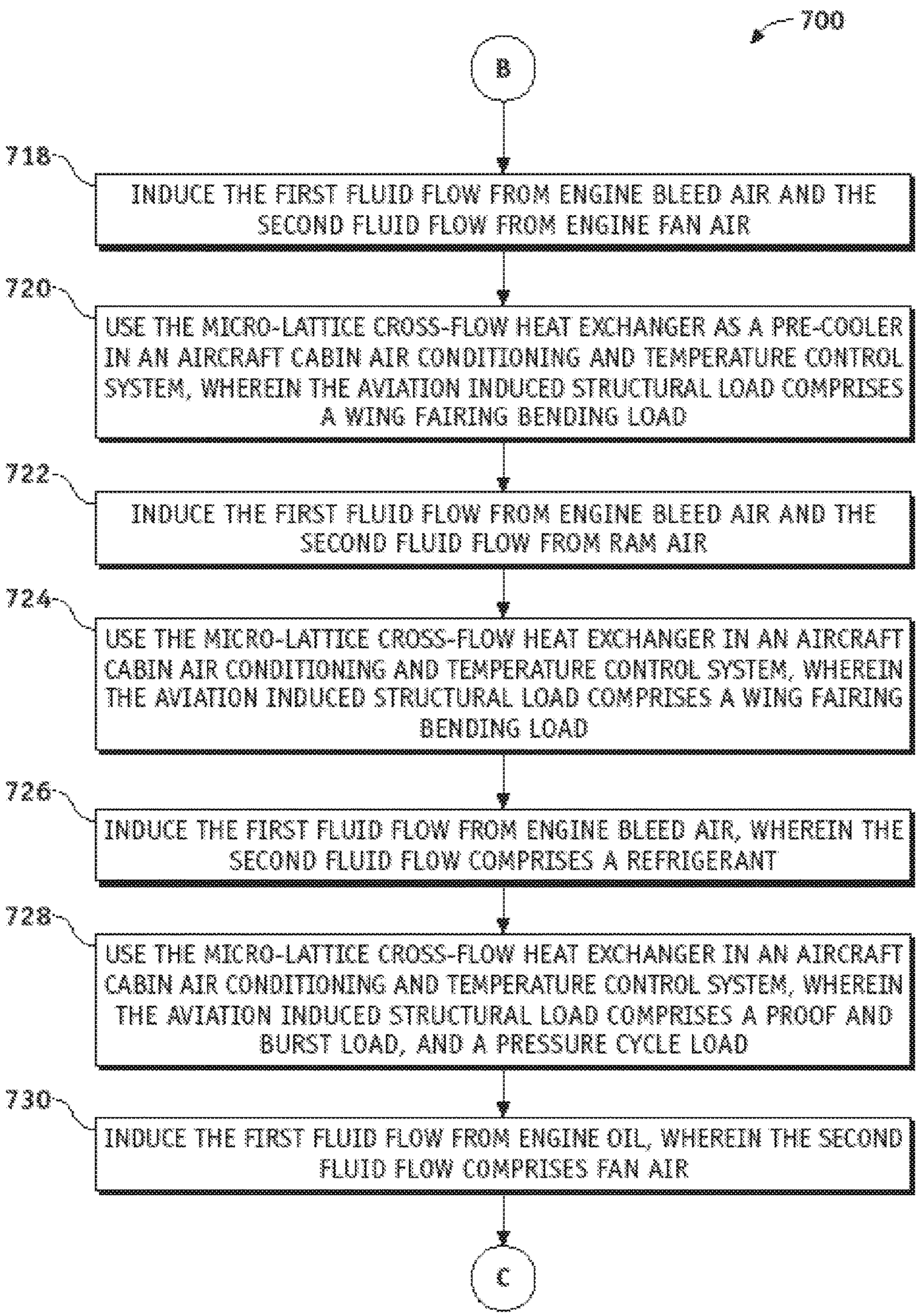
FIG. 7B is an illustration of a continuation of the exemplary flowchart of FIG. 7A showing a process for operating a micro-lattice cross-flow heat exchanger for an aircraft according to an embodiment of the disclsoure.
Figure 7C:
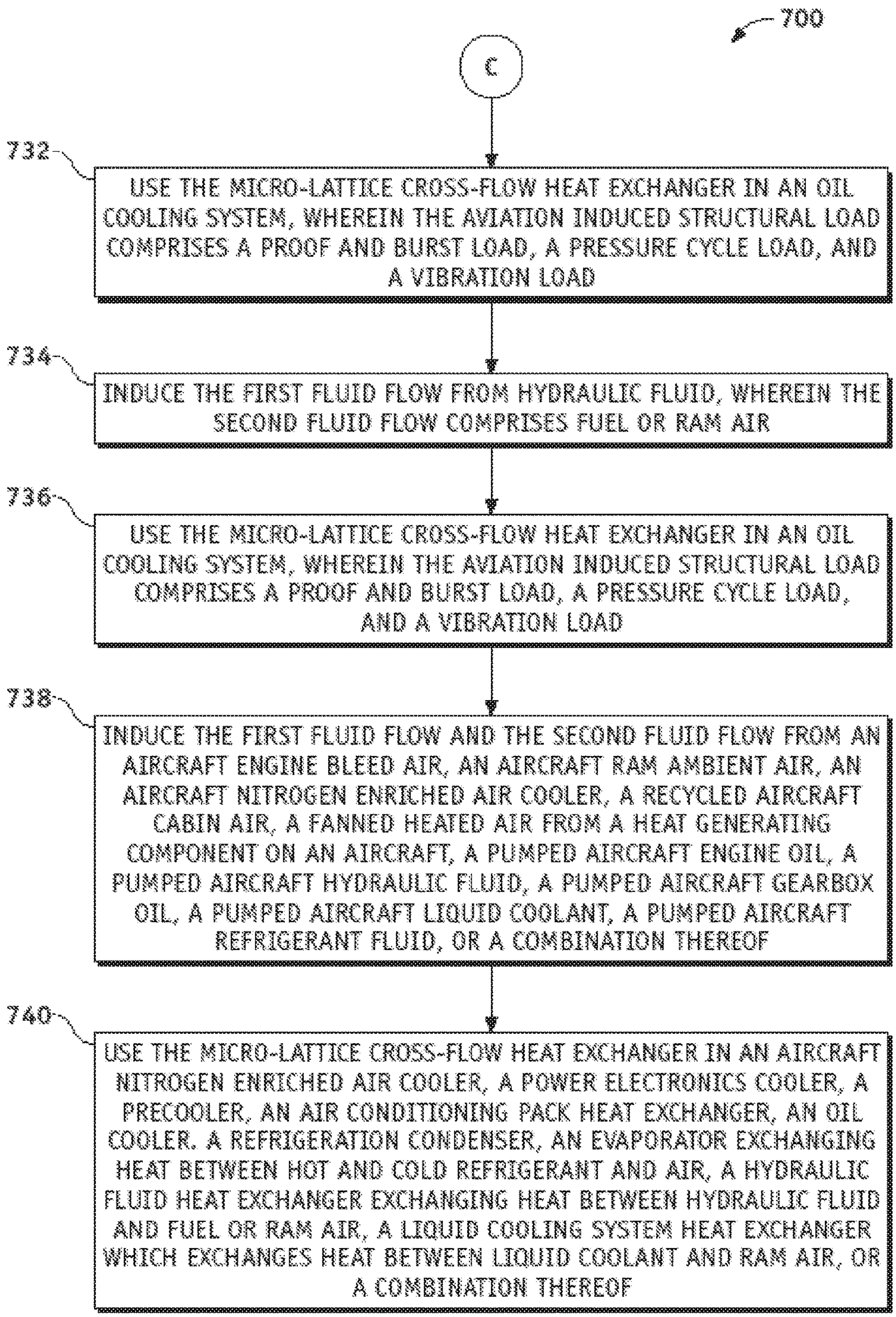
FIG. 7C is an illustration of a continutation of the exemplary flowchart of FIG. 7B showing a process for operating a micro-lattice cross-flow heat exchanger for an aircraft according to an embodiment of the disclosure.

FIGS. 7A-7C are an illustration of an exemplary flowchart showing a process for operating a micro-lattice cross-flow heat exchanger for an aircraft according to an embodiment of the disclosure. The various tasks performed in connection with process 700 may be performed mechanically, by software, hardware, firmware, or any combination thereof. For illustrative purposes, the following description of process 700 may refer to elements mentioned above in connection with FIGS. 1-4. In some embodiments, portions of the process 700 may be performed by different elements of the micro-lattice cross-flow heat exchanger 300/400 such as the structural body 320/514, the manifold 306/322, the hollow channels 304/316, the hollow nodes 302/314, the first aircraft system 552, the second aircraft system 554, etc. Process 700 may have functions, material, and structures that are similar to the embodiments shown in FIGS. 1-4. Therefore common features, functions, and elements may not be redundantly described here.

Process 700 may begin by receiving a first fluid in a first aircraft fluid source inlet from a first aircraft system (task 702).

Process 700 may continue receiving a second fluid in a second aircraft fluid source inlet from a second aircraft system (task 704).

Process 700 may continue by supporting an aviation structural load on a structural body forming two interpenetrating fluidically isolated volumes and comprising a plurality of hollow channels comprising a hollow three-dimensional micro-truss comprising a plurality of hollow truss elements extending along at least three directions, and a plurality of hollow nodes interpenetrated by the hollow truss elements (task 706).

Process 700 may continue by flowing the first fluid from the first aircraft fluid source inlet into the hollow channels through a first manifold comprising a plurality of first openings into the hollow channels (task 708).

Process 700 may continue by flowing the first fluid within the hollow channels (task 710).

Process 700 may continue by flowing the first fluid out of a second manifold comprising a plurality of second openings from the hollow channels (task 712).

Process 700 may continue by flowing the second fluid from the second aircraft fluid source inlet external to the hollow channels (task 714).

Process 700 may continue by transferring heat between the first fluid flow and the second fluid flow via the structural body (task 716).

Process 700 may continue by inducing the first fluid flow from engine bleed air and the second fluid flow from engine fan air (task 718).

Process 700 may continue by using the micro-lattice cross-flow heat exchanger in an aircraft cabin air conditioning and temperature control system, wherein the aviation structural load comprises a wing fairing bending load (task 720).

Process 700 may continue by inducing the first fluid flow from engine bleed air and the second fluid flow from ram air (task 722).

Process 700 may continue by using the micro-lattice cross-flow heat exchanger in an aircraft cabin air conditioning and temperature control system, wherein the aviation structural load comprises a wing fairing bending load (task 724).

Process 700 may continue by inducing the first fluid flow from engine bleed air, wherein the second fluid flow comprises a refrigerant (task 726). The refrigerant may comprise, for example but without limitation, Freon, Freon replacements (e.g., R134a), water, chlorofluorocarbons, ram air, fan air, or other refrigerant.

Process 700 may continue by using the micro-lattice cross-flow heat exchanger in an aircraft cabin air conditioning and temperature control system, wherein the aviation structural load comprises a proof and burst load, and a pressure cycle load (task 728).

Process 700 may continue by inducing the first fluid flow from engine oil, wherein the second fluid flow comprises fan air (task 730).

Process 700 may continue by using the micro-lattice cross-flow heat exchanger in an oil cooling system, wherein the aviation structural load comprises a proof and burst load, a pressure cycle load, and a vibration load (task 732).

Process 700 may continue by inducing the first fluid flow from hydraulic fluid, wherein the second fluid flow comprises fuel or ram air (task 734).

Process 700 may continue by using the micro-lattice cross-flow heat exchanger in an oil cooling system, wherein the aviation structural load comprises a proof and burst load, a pressure cycle load, and a vibration load (task 736).

Process 700 may continue by inducing the first fluid flow and the second fluid flow from an aircraft engine bleed air, an aircraft RAM ambient air, an aircraft nitrogen enriched air cooler, a recycled aircraft cabin air, a fanned heated air from a heat generating component on an aircraft, a pumped aircraft engine oil, a pumped aircraft hydraulic fluid, a pumped aircraft gearbox oil, a pumped aircraft liquid coolant, and a pumped aircraft refrigerant fluid, or a combination thereof (task 738).

Process 700 may continue by using the micro-lattice cross-flow heat exchanger in an aircraft nitrogen enriched air cooler, a power electronics cooler, a precooler, an air conditioning pack heat exchanger, an oil cooler. a refrigeration condenser, an evaporator exchanging heat between hot and cold refrigerant and air, a hydraulic fluid heat exchanger exchanging heat between hydraulic fluid and fuel or ram air, a liquid cooling system heat exchanger which exchanges heat between liquid coolant and ram air, or a combination thereof (task 740).

FIG. 8 is an illustration of an end view 806, a section A-A view 802, and a section B-B view 804 of an exemplary schematic of a micro-lattice cross-flow heat exchanger 800 (heat pipe 800) according to an embodiment of the disclosure. The micro-lattice cross-flow heat exchanger 800 comprises a heat pipe configuration, thus the micro-lattice cross-flow heat exchanger 800 and the heat pipe 800 may be used interchangeably in this document. The micro-lattice cross-flow heat exchanger 800 may comprise a micro-truss structural body 812 (320/514 in FIGS. 3 and 5) comprising the hollow channels 304/316/546/544 (FIGS. 3 and 5). The heat pipe 800 may comprise, for example, a 2-sided heat pipe interconnected by the micro-truss structural body 812. The micro-truss structural body 812 functions as a condenser for a heat pipe fluid (not shown) within the micro-truss structural body 812 that is vaporized at sides 828/830 that are exposed to a heat load(flux) 832/834 respectively. The heat pipe fluid of the heat pipe 800 may comprise, for example but without limitation, water, Freon, a hydrocarbon, an ionic liquid, or other fluid.

Each side 824/826/828/830 of the micro-lattice cross-flow heat exchanger 800 comprises a wick structure 816/818/820/822 respectively. The wick structure 816/818/820/822 may be configured on a subset of the sides 824/826/828/830 such as, but without limitation, all of the sides 824/826/828/830, three sides among the sides 824/826/828/830, a single side among the sides 824/826/828/830, or other configuration. In some embodiments, a laterally oriented wick structure in all adjacent four of the sides 824/826/828/830 provide return paths of condensed fluid back to a hot spot on one or more of the sides 824/826/828/830. In various embodiments, the wick structure 816/818/820/822 may comprise, for example but without limitation, a longitudinally oriented wick structure, a laterally oriented wick structure, an omni-directionally oriented wick structure, or other wick structure.

In some embodiments, a cooling fluid 808 enters a first side 836 of the micro-lattice cross-flow heat exchanger 800 and flows through and around an exterior 814 of the micro-truss structural body 812. The cooling fluid 808 may exit a second side 838 of the micro-lattice cross-flow heat exchanger 800.

Heat applied to any area of the sides 824/826/828/830 of the micro-lattice cross-flow heat exchanger 800 results in the heat pipe fluid evaporating from point(s) of exposure and a vapor of the heat pipe fluid migrating into the hollow channels 304/316 (FIG. 3) of the micro-truss structural body 812 in closest proximity to the point(s) of exposure. A flow of the cooling fluid 808 through and around the exterior 814 of the micro-truss structural body 812 then absorbs heat from the vapor of the heat pipe fluid and causes it to condense to a condensed refrigerant. The condensed refrigerant flows through the micro-truss structural body 812 (e.g., guided by gravity) to the wick structure 816/818/820/822 in a lowest of the sides 824/826/828/830. Capillary action in the wick structure 816/818/820/822 then guides the condensed refrigerant back to the hot spot, where the cycle begins again.

In an embodiment, the first aircraft system 552 comprises a heat pipe surface (not shown) operable to vaporize the heat pipe fluid in response to heating of the heat pipe surface to provide the vaporized heat pipe fluid.

Figure 9:
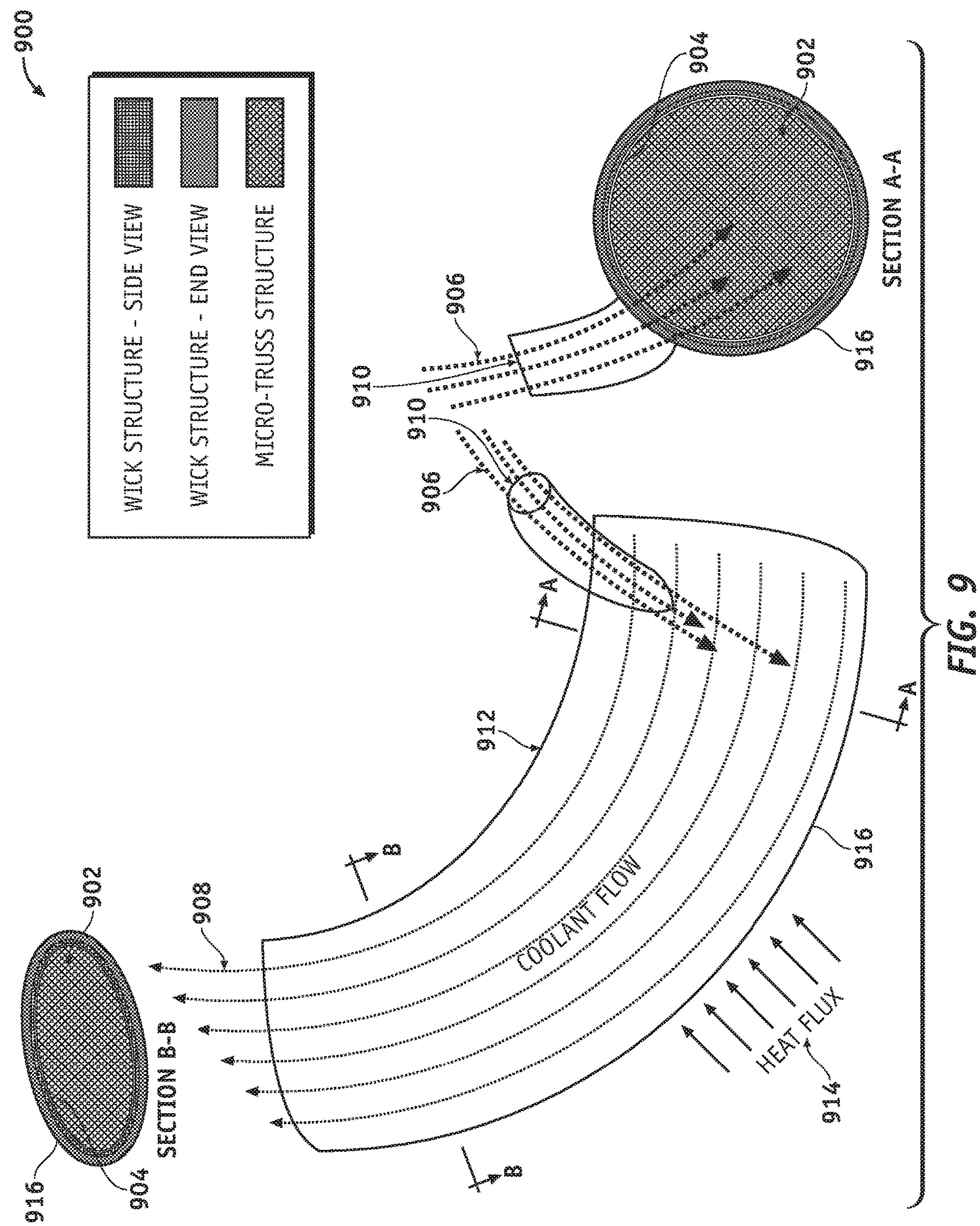
FIG. 9 is an illustration of an exemplary schematic of a micro-lattice cross-flow heat exchanger comprising a heat pipe according to an embodiment of the disclosure.

FIG. 9 is an illustration of an end view, a section A-A view, and a section B-B view of an exemplary schematic of a micro-lattice cross-flow heat exchanger 900 comprising a heat pipe configuration according to an embodiment of the disclosure. The micro-lattice cross-flow heat exchanger 900 may comprise various cross-section shape configurations of a flow body 912 such as, but without limitation, circles, ellipses, triangles, pentagons, polygons, variable cross-sections along their lengths, or a combination thereof. A surface 916 of the micro-lattice cross-flow heat exchanger 900 absorbs a heat flux 914. The micro-lattice cross-flow heat exchanger 900 comprises longitudinal and lateral wick structures 904, and a hollow micro-truss structure 902 occupies a center of the micro-lattice cross-flow heat exchanger 900.

A cooling fluid 908 enters the micro-lattice cross-flow heat exchanger 900 through a coolant inlet 906 and flows through and around an exterior of the hollow micro-truss structure 902. The cooling fluid 908 absorbs heat from the hollow micro-truss structure 902 and a vaporized heat pipe fluid (not shown). Thereby, the hollow micro-truss structure 902 serves as a condenser to condense the vaporized heat pipe fluid into a condensed refrigerant (not shown). The wick structures 904 transport the condensed refrigerant from the hollow micro-truss structure 902 back to the wick structures 904 and back to a heated area, thereby enabling continuous evaporation and, in effect, management of a heat load.

In this manner, embodiments of the disclosure provide a cost-effective fluid flow interface to a hollow porous material, which reduces discontinuities and sharp edges and consequently reduces flow disruption, reduces pressure drop for fluid flowing into the hollow porous material, and/or increases pressure recovery for fluid exiting the hollow porous material.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An aircraft, comprising:

an airframe;

a propulsion system; and a heat exchanger comprising:

a structural body operable to support aviation induced structural loads, wherein the structural body includes a plurality of hollow channels forming two interpenetrating fluidically isolated volumes, and wherein each of the plurality of hollow channels comprise a hollow three-dimensional micro-truss comprising a plurality of hollow truss elements extending along at least three directions, and a plurality of hollow nodes interpenetrated by the hollow truss elements;

a first fluid positioned within the plurality of hollow channels of the structural body;

a first plurality of openings in fluid communication with the first plurality of hollow channels, wherein the first plurality of openings are positioned on a first side of the structural body;

a first wick structure positioned on the first side of the structural body, wherein the first wick structure is positioned adjacent to an exterior of the plurality of hollow channels and in fluid communication with the first plurality of openings;

a second plurality of openings positioned on a second side of the structural body, wherein the second side is positioned opposite the first side;

a second wick structure positioned on the second side of the structural body, wherein the second wick structure is positioned adjacent to an exterior of the plurality of hollow channels and in fluid communication with the second plurality of openings;

a third wick structure positioned on a third side of the structural body, wherein the third side is positioned perpendicular to the first side and the second side, and wherein the third wick structure is in fluid communication with the first wick structure and the second wick structure;

a fourth wick structure positioned on the fourth side of the structural body, wherein the fourth side is positioned opposite the third side, and wherein the fourth wick structure is in fluid communication with the first wick structure and the second wick structure;

an inlet to the structural body operable to provide a second fluid from an aircraft system, wherein the second fluid comprises a cooling fluid, wherein the second fluid is configured to flow external to the plurality of hollow channels and isolated from the first fluid such that the structural body is operable to exchange heat between the first fluid and the second fluid; and an outlet from the structural body operable to receive the second fluid after receiving heat from the first fluid.

2. The aircraft of claim 1, wherein the aviation induced structural loads comprise proof and burst, air pressure cycling, vibration, airframe structural support, an inertial load, a thermal cycling load, or a combination thereof.

3. The aircraft of claim 1, wherein the first fluid comprises water, Freon, a hydrocarbon, an ionic liquid, or a combination thereof.

4. The aircraft of claim 1, wherein the second fluid comprises engine bleed air, an aircraft RAM ambient air, an aircraft nitrogen enriched air cooler, a recycled aircraft cabin air, a fanned heated air from a heat generating component on an aircraft, a pumped aircraft engine oil, a pumped aircraft hydraulic fluid, a pumped aircraft gearbox oil, a pumped aircraft liquid coolant, a pumped aircraft refrigerant fluid, a coolant, or a combination thereof.

5. The aircraft of claim 1, wherein each of the first wick structure, the second wick structure, the third wick structure, and the fourth wick structure comprise one of a longitudinally oriented wick structure, a laterally oriented wick structure, an omni-directionally oriented wick structure, or a combination thereof.

6. The aircraft of claim 1, wherein each of the first wick structure, the second wick structure, the third wick structure, and the fourth wick structure comprise a laterally oriented wick structure that provides a plurality of return paths for the first fluid to a hot spot on one or more of the first side of the structural body, the second side of the structural body, the third side of the structural body, and the fourth side of the structural body.

7. A micro-lattice cross-flow heat exchanger for an aircraft, comprising:

a structural body operable to support aviation induced structural loads, wherein the structural body includes a plurality of hollow channels forming two interpenetrating fluidically isolated volumes, and wherein each of the plurality of hollow channels comprise a hollow three-dimensional micro-truss comprising a plurality of hollow truss elements extending along at least three directions, and a plurality of hollow nodes interpenetrated by the hollow truss elements;

a first fluid positioned within the plurality of hollow channels of the structural body;

a first plurality of openings in fluid communication with the plurality of hollow channels, wherein the first plurality of openings are positioned on a first side of the structural body;

a first wick structure positioned on the first side of the structural body, wherein the first wick structure is positioned adjacent to an exterior of the plurality of hollow channels and in fluid communication with the first plurality of openings;

a second plurality of openings positioned on a second side of the structural body, wherein the second side is positioned opposite the first side;

a second wick structure positioned on the second side of the structural body, wherein the second wick structure is positioned adjacent to an exterior of the plurality of hollow channels and in fluid communication with the second plurality of openings;

a third wick structure positioned on a third side of the structural body, wherein the third side is positioned perpendicular to the first side and the second side, and wherein the third wick structure is in fluid communication with the first wick structure and the second wick structure;

a fourth wick structure positioned on the fourth side of the structural body, wherein the fourth side is positioned opposite the third side, and wherein the fourth wick structure is in fluid communication with the first wick structure and the second wick structure;

an inlet to the structural body operable to provide a second fluid from an aircraft system, wherein the second fluid comprises a cooling fluid, wherein the second fluid is configured to flow external to the plurality of hollow channels and isolated from the first fluid such that the structural body is operable to exchange heat between the first fluid and the second fluid; and an outlet from the structural body operable to receive the second fluid after receiving heat from the first fluid.

8. The micro-lattice cross-flow heat exchanger of claim 7, wherein each of the first wick structure, the second wick structure, the third wick structure, and the fourth wick structure comprise one of a longitudinally oriented wick structure, a laterally oriented wick structure, an omni-directionally oriented wick structure, or a combination thereof.

9. The micro-lattice cross-flow heat exchanger of claim 7, wherein each of the first wick structure, the second wick structure, the third wick structure, and the fourth wick structure comprise a laterally oriented wick structure that provides a plurality of return paths for the first fluid to a hot spot on one or more of the first side of the structural body, the second side of the structural body, the third side of the structural body, and the fourth side of the structural body.

* * * * *